May 3, 1955
A. M. HOOVER ET AL
2,707,584
METHOD OF FILLING THERMAL RESPONSIVE
ELEMENTS AND SEALING TUBES
Filed Feb. 15, 1951
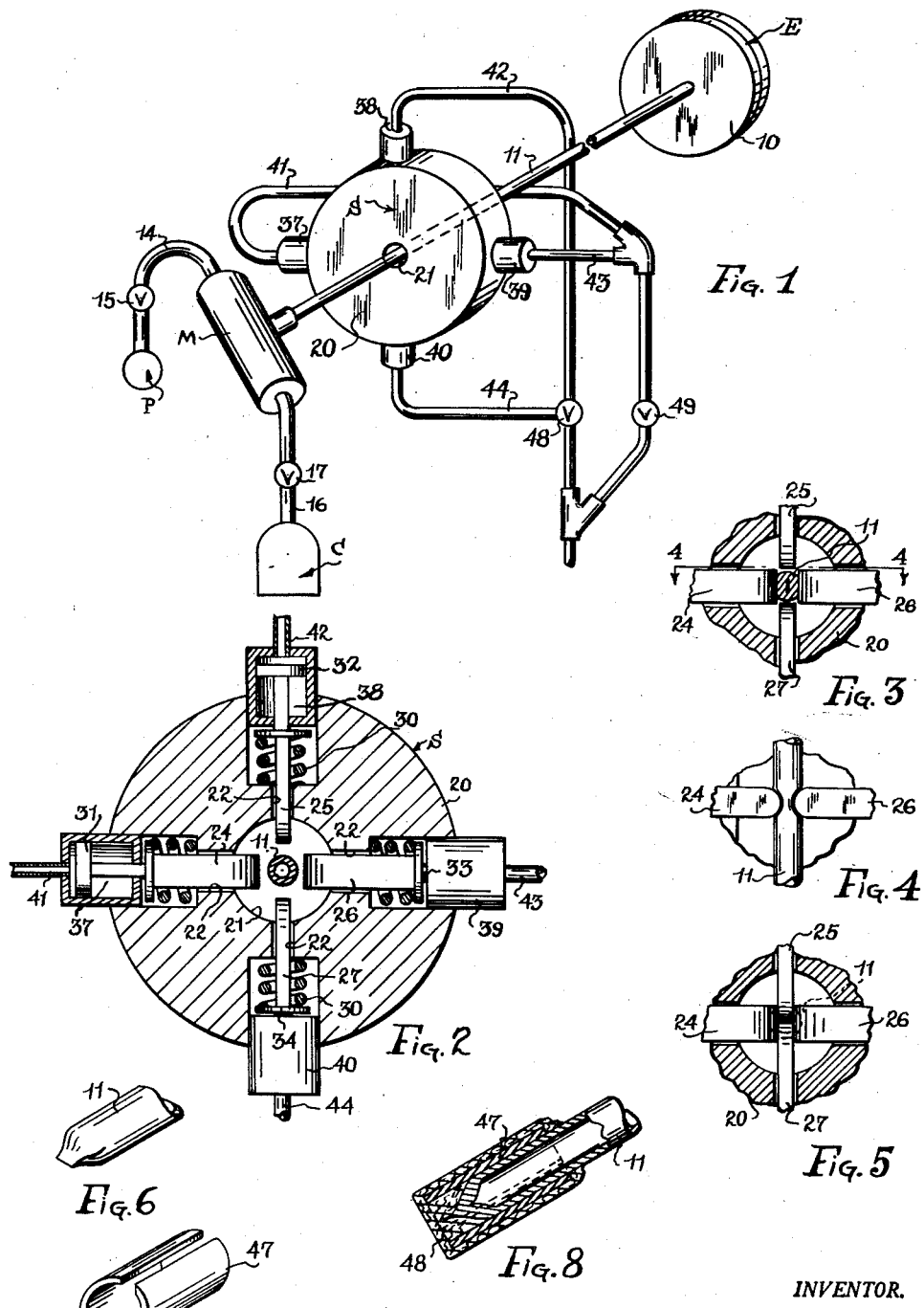
INVENTOR.
ARTHUR M. HOOVER
BY FREDERICK A. GREENAWALT
ATTORNEYS ย
United States Patent Office 2,707,584
Patented May 3, 1955

2,707,584

METHOD OF FILLING THERMAL RESPONSIVE ELEMENTS AND SEALING TUBES

Arthur M. Hoover, Powell, and Frederick A. Greenawalt, Columbus, Ohio, assignors to Ranco Inc., Columbus, Ohio, a corporation of Ohio Application February 15, 1951, Serial No. 211,052

8 Claims. (Cl. 226—20.1)

The present invention relates to a method of charging an expansible thermal responsive element with a fluid which is subject to impairment by heat, which method includes fusion or "cold" welding a metallic tube without the application of heat thereto deleterious to the fluid.

A thermal responsive device commonly used to operate electric switches, valves, gauges, etc. comprises an expansible chamber, such as a metallic bellows, having a relatively small diameter metallic tube, commonly referred to as a "capillary tube," connected therewith and sealed at a point, usually remote from the expansible chamber. The tube and chamber are filled or charged with a thermal responsive fluid which changes in volume or pressure according to the temperature thereof. Fluids frequently employed are methyl-chloride, Freon or sulphur dioxide, protane or butane, usually in vapor form, and the vapor pressure thereof in the device varies according to the temperature at the coolest part of the chamber and tube. It has been the general practice to charge these devices with the thermal responsive fluid through the tube and seal off the tube by first crimping the walls together at one portion thereof, then severing the tube at the crimped portion and immediately dipping the crimped end into molten silver solder or otherwise applying a coating of solder to permanently seal the tube. It has been found that the heat of the molten solder which may range from 1200° F. to 1800° F., applied to the tube causes deterioration of a portion of the thermal responsive fluid in the tube, which renders the thermal responsive device inaccurate and erratic in its response to temperatures.

One of the objects of the present invention is to provide a method of charging and sealing thermal responsive devices of the type mentioned with fluids which are subject to impairment by heating thereof without the application of any appreciable heat to any part of the devices.

Another object of the invention is to provide a method of sealing a tube by confining a portion thereof between two oppositely disposed members and then mashing or crushing the tube intermediate the confining members between two oppositely disposed inclined jaw members with sufficient pressure to fuse or cold weld the walls of the tube and to substantially sever the tube between the members at the fused portion.

A further object of the invention is to provide a method of sealing a metallic tube by first collapsing opposite sides of the tube inwardly between two inclined jaw members and while confining the collapsed walls therebetween, crushing the collapsed portion of the tube intermediate the jaws between two oppositely disposed inclined jaw members with sufficient pressure to sever the tube while forming a tapering cold welded end of the tube.

Other objects and advantages of the invention will be apparent from the following description of a preferred form of the invention, reference being made to the accompanying drawing wherein;

Fig. 1 is a schematic showing of a thermal responsive element connected with an exhausting and fluid charging system;

Fig. 2 is a transverse sectional view of a device for severing and welding a tube of the thermal responsive element;

Fig. 3 is a fragmentary sectional view similar to Fig. 2, showing certain parts in different positions;

Fig. 4 is a sectional view taken on line 4—4 of Fig. 3;

Fig. 5 is a view similar to Fig. 3 but showing certain parts in different positions;

Fig. 6 is a fragmentary perspective view of a closed end of a capillary tube;

Fig. 7 is a perspective view of a sleeve; and

Fig. 8 is a perspective view of the end of a sealed capillary tube showing a cap, partially broken away, covering the end of the tube.

In general, the invention contemplates exhausting air from the interior of an expansible thermal element, which includes a relatively soft metallic tube, such as copper, by alternately connecting the tube with a suction pump and a source of thermal responsive fluid of the type mentioned, and while the tube is connected with the source of thermal responsive fluid, confining opposite sides of a portion of the tube to at least within the peripheral bounds of the tube proper and then crushing the tube between the confined sides by two relatively hard curved or inclined jaws moving against the walls of the tube intermediate the confined sides, and which jaws are shaped to produce a taper to the portion of the tube therebetween and which are pressed together with sufficient force to sever or substantially sever the tube without shearing the metal thereof. The pressure applied to the tube by the jaws apparently causes the metal of the walls of the tube to flow inwardly and axially relative to the tube and to fuse the walls of the tube together and form a tapered end wall of the tube which is stronger than the walls of the tube proper. The charging and sealing steps including the pressure welding of the tube, are carried out at room temperatures so that the fluid in the thermal element is not subjected to deleterious temperatures.

In the preferred embodiment of the invention the tube is confined at the section to be severed by collapsing opposite sides inwardly by movable jaws which do not cause appreciable fusion of the opposite walls after which the walls of the tube between the planes of the tube collapsing jaws are compressed between tapering or inclined jaws to cause the metal of the tube to flow inwardly and axially of the tube and form a homogeneous, fused end of the tube.

Referring now to the drawings, an expansible element E is shown which includes an expansible wafer-like chamber 10 comprised of two suitable dish shaped flexible walls, which may be of beryllium copper or the like, joined together at the rims thereof, and a copper tube 11, generally known in the art as a capillary tube which is hermetically sealed to the chamber 10 in any suitable manner. The expansible chamber 10 can be of any suitable construction or material other than that shown, if desired. The tube 11 when assembled to the chamber 10 is slightly longer than required in the finished element and its outer free end is open so that the chamber and tube can be exhausted of air and filled with a suitable fluid therethrough. The outside diameter of a tube commonly used is in the order of three-thirty seconds of an inch.

The exhausting and filling of the element E is referred to as the "charging" operation and is preferably carried out by providing a manifold M, which may be of any suitable design, to which the open end of the tube 11 can be hermetically coupled, preferably by a type of connector which can be readily manipulated for quickly connecting and disconnecting capillary tubes therewith. The manifold can have a plurality of tube connecting means so that a number of elements can be attached thereto and charged at one time. The interior of the manifold M is connected to an exhaust pump P through a suitable line 14, which line includes a cut-off valve 15. The manifold is also connected with a cylinder C containing a suitable thermal responsive fluid, such as sulphur dioxide, methyl-chloride, butane, propane or Freon through a line 16 having a cut-off valve 17 therein.

The pump P and valves 15, 17 are controlled to alternately evacuate and fill the chamber 10 and tube 11 with fluid from the cylinder C a number of times to assure that the element is charged with fluid entirely free of air.

After the element E is charged with fluid and while tube 11 is still connected with the manifold, the tube 11 is sealed and severed a short distance from the manifold M by a device S which is in the form shown comprises an annular body 20 having a central circular opening 21 through which the tube extends. The body 20 has four radially extending openings 22 rectangular in cross section and which are spaced 90° from one another and lie within a plane normal to the axis of the opening 21. The openings 22 have reciprocable bar shaped jaw members 24, 25, 26, 27 therein which are preferably of hardened steel and which have arcuate shaped inner ends, the arcs of which inner ends lie in planes containing the axis of the opening 21 so that the inner ends may engage the tube 11 and depress the sides of the tube inwardly. The jaw members are normally urged outwardly by coil springs 30 and are forced inwardly by hydraulic pistons 31, 32, 33, 34 respectively. The pistons 31-34 operate in cylinders 37, 38, 39, 40 respectively, which are attached to the body 20 and hydraulic pressure is supplied to the cylinders through lines 41, 42, 43, 44. Lines 42, 44 are connected to a control valve 48 and lines 41, 43 are connected to a control valve 49 so that opposing pistons are operated simultaneously. The valves 48, 49 are connected with a suitable hydraulic pump, not shown. The members 24, 26 have limited inward movement so that when moved to their innermost positions, they collapse the tube 11 as shown in Figs. 3, 4 but are sufficiently spaced to permit the members 25, 27 to move therebetween, as seen in Fig. 5.

The members 25, 27 are adapted to move substantially into engagement with one another to pinch or crush the tube 11 with sufficient force to cause substantially all of the metal therebetween to flow to opposite sides of the medial portions of the tube engaging ends of the members and sever or substantially sever the tube. If the tube is not completely severed, a thin web of metal will join the two portions of the tube on opposite sides of the crushing members, which web is easily broken by flexing the tube at the web. It will be seen that in sealing and severing the tube, jaw members 24, 26 are first actuated to collapse the tube and while retained against the tube walls, the members 25, 27 are forced inwardly to pinch or crush off the tube, as desired. By shaping the tube engaging portions of the members 24, 25, 26, 27, arcuate, the tube is not cut but the metal thereof is caused to flow inwardly and axially from between the opposing members 25, 27 and fuse the walls which taper to a point, at the end of the tube. The action of first collapsing the tube between the arcuate members 24, 26 on opposite sides thereof and then crushing the tube between the members 25, 27 moving between the tube collapsing members 24, 26 causes the interior of the tube to be gradually reduced in diameter toward the pinched off portion, and the compressed walls to become fused at the tapered end of the tube to form a homogeneous end wall of the tube having a relatively minute area subjected to the fluid pressure inside the tube. Thus, the tube is actually stronger at the closed end than in any other part thereof.

As may be seen in Fig. 6 the sealed and severed end of the tube 11 has a relatively sharp point which is sometimes undesirable as it may create hazards in handling, and this end is preferably capped to enclose the point. The cap may consist of a sheet metal sleeve 47 which may be frictionally telescoped over the pointed end of the tube 11 and then the tube end is dipped into a low temperature solder which forms a coating 48 over the sleeve and closes the outer end thereof. The melting point of the solder is below that apt to injure the fluid in the thermal element and it preferably has a melting point of between 200° F. and 300° F.

By our invention, the tube 11 can be quickly and permanently sealed without the application of heat thereto, which would otherwise cause deterioration of commonly used thermal responsive fluids, and the equipment for closing and severing the tube may be inexpensive to produce and requires little if any maintenance.

Although we have described but one form of the invention it is to be understood that other forms, adaptations and modifications might be made, all of which are within the scope of the claims which follow.

Having thus described our invention, we claim:

1. The method of sealing a copper tube which comprises confining two opposite side portions of the tube against outward movement, and while confining said side portions compressing the remaining side portions at the region of confinement along a surface inclined to the axis of the tube to cause metal to flow from a point intermediate the confined portions in a direction longitudinally of the tube until the tube is substantially severed at said point.

2. The method of sealing a copper tube which comprises collapsing two opposite side portions of the tube to substantially close the tube, confining the collapsed side portions and then compressing the remaining side portions at the region of confinement along a surface inclined to the axis of the tube to cause metal to flow from a point intermediate the confined portions in a direction longitudinally of the tube until the tube is substantially severed at said point.

3. The method of sealing a copper tube which comprises confining two opposite side portions of the tube against outward movement, and compressing the remaining side portions at the region of confinement between two merging jaws having tube engaging surfaces inclined to the axis of the tube to cause metal to flow from a point intermediate the confined portions in a direction longitudinally of the tube until the tube is substantially severed at said point.

4. The method of sealing a copper tube which comprises collapsing two opposite walls of the tube to substantially close the tube, confining the collapsed walls between two spaced jaws having inclined surfaces flaring outwardly from the collapsed portion of the tube, and while confining the collapsed walls between said jaws, crushing the remaining side portions of the tube at the region of confinement between two jaws inclined to the axis of the tube and flaring to cause metal of the tube to flow from a point intermediate the collapsed portion in a direction longitudinally of the tube until the tube is substantially severed at said point.

5. The method of manufacturing a thermal responsive element formed of a hollow expansible chamber and a copper tube attached thereto filled with a thermal responsive fluid subject to deterioration by heating up to 1800° F., which method comprises evacuating the element through one end of the tube, charging the element with the thermal responsive fluid, collapsing opposite side portions of the tube and compressing the remaining side portions of the collapsed portion of the tube between inclined surfaces to fuse or weld the metal of the walls together to close the tube while maintaining the temperature of the tube and chamber substantially below temperatures adversely affecting the fluid.

6. The method of manufacturing a thermal responsive element formed of a hollow expansible chamber and a copper tube attached thereto filled with a thermal responsive fluid of one of a class consisting of Freon, methyl-chloride, sulfur dioxide, methane or propane, which method comprises evacuating the element through one end of the tube, charging the element with the thermal responsive fluid, collapsing opposite side portions of the tube and compressing the remaining side portions of the collapsed portion of the tube between inclined surfaces to fuse or weld the metal of the walls together to close the tube while maintaining the temperature of the tube and chamber substantially below temperatures adversely affecting the fluid.

7. The method of manufacturing a thermal responsive element formed of a hollow expansible chamber and a copper tube attached thereto filled with a thermal responsive fluid subject to deterioration by heating above 300° F., which method comprises evacuating the element through one end of the tube, charging the element with the thermal responsive fluid, collapsing opposite side portions of the tube and compressing the remaining side portions of the collapsed portion of the tube between inclined surfaces to fuse or weld the metal of the walls together to close the tube while maintaining the temperature of the tube and chamber substantially below 300° F.

8. The method of sealing a copper tube which comprises collapsing two opposite side portions of the tube to flatten a portion of the tube, and then crushing the flattened portion of the tube between inclined surfaces engaging and compressing the opposing uncollapsed side portions of the tube to cause metal to flow longitudinally of the tube until the tube is substantially severed.

References Cited in the file of this patent

UNITED STATES PATENTS

| | | |
|---|---|---|
| 2,427,597 | Garner | Sept. 16, 1947 |
| 2,513,739 | O'Neill | July 4, 1950 |

FOREIGN PATENTS

| | | |
|---|---|---|
| 10,262 | Great Britain | July 14, 1888 |
| 107,400 | Australia | May 10, 1939 |